US012686501B2

(12) United States Patent (10) Patent No.: US 12,686,501 B2
Gregoire et al. (45) Date of Patent: Jul. 21, 2026

(54) AIRCRAFT WITH HYBRID POWER SOURCE AND WITH JUNCTION HAVING A TRANSISTOR FOR DISTRIBUTION AND PROTECTION

(71) Applicant: Ascendance Flight Technologies, Toulouse (FR)

(72) Inventors: Jérôme Gregoire, Toulouse (FR); Ludovic Lam Shang Leen, Toulouse (FR)

(73) Assignee: ASCENDANCE FLIGHT TECHNOLOGIES, Toulouse (FR)

( * ) Notice: Subject to any disclaimer, the term of this patent is extended or adjusted under 35 U.S.C. 154(b) by 0 days.

(21) Appl. No.: 19/149,244

(22) PCT Filed: Jan. 16, 2024

(86) PCT No.: PCT/FR2024/050059
§ 371 (c)(1),
(2) Date: Jul. 18, 2025

(87) PCT Pub. No.: WO2024/153884
PCT Pub. Date: Jul. 25, 2024

(65) Prior Publication Data
US 2026/0116565 A1 Apr. 30, 2026

(30) Foreign Application Priority Data
Jan. 20, 2023 (FR) ..................................... 2300535

(51) Int. Cl.
*B64C 29/00* (2006.01)
*B64D 27/10* (2006.01)
(Continued)

(52) U.S. Cl.
CPC .............. *B64D 31/18* (2024.01); *B64C 29/00* (2013.01); *B64D 27/33* (2024.01)

(58) Field of Classification Search
CPC ........ B64D 31/18; B64D 27/33; B64D 27/10; B64D 27/35; B64D 35/024; B64C 29/00
(Continued)

(56) References Cited

U.S. PATENT DOCUMENTS

2021/0075331 A1 3/2021 Tariq
2021/0370786 A1* 12/2021 Vinson .................... B60L 53/24

FOREIGN PATENT DOCUMENTS

DE 102016202195 A1 8/2017
FR 3118622 A1 7/2022
FR 3122642 A1 11/2022

OTHER PUBLICATIONS

International Search Report for Application No. PCT/FR2024/050059 dated Apr. 4, 2024, 6 pages (with English translation).
(Continued)

*Primary Examiner* — Rexford N Barnie
*Assistant Examiner* — Xuan Ly
(74) *Attorney, Agent, or Firm* — Boone IP Law

(57) ABSTRACT

An aircraft includes drive units, at least one battery of the drive units, at least one electrical generation source connected to each battery and comprising at least one electrical converter, and a power supply control device to control each electrical generation source according to the power requirements of the drive units and to treat each battery passively. Each electrical converter is connected to each battery via a respective junction including two metal-oxide-semiconductor field-effect transistors connected in series and of opposite forward directions. Each junction can operate exclusively according to a unidirectional state in which the current flows from the electrical converter to the battery, a bidirectional state, and a blocking state.

15 Claims, 6 Drawing Sheets

(51) Int. Cl.

| | |
|---|---|
| *B64D 27/33* | (2024.01) |
| *B64D 27/35* | (2024.01) |
| *B64D 31/18* | (2024.01) |
| *B64D 35/024* | (2025.01) |

(58) Field of Classification Search
USPC ......................................................... 307/9.1
See application file for complete search history.

(56) References Cited

OTHER PUBLICATIONS

Written Opinion of the International Searching Authority for Application No. PCT/FR2024/050059 dated Apr. 4, 2024, 10 pages (with English translation).

* cited by examiner

[Fig. 1]
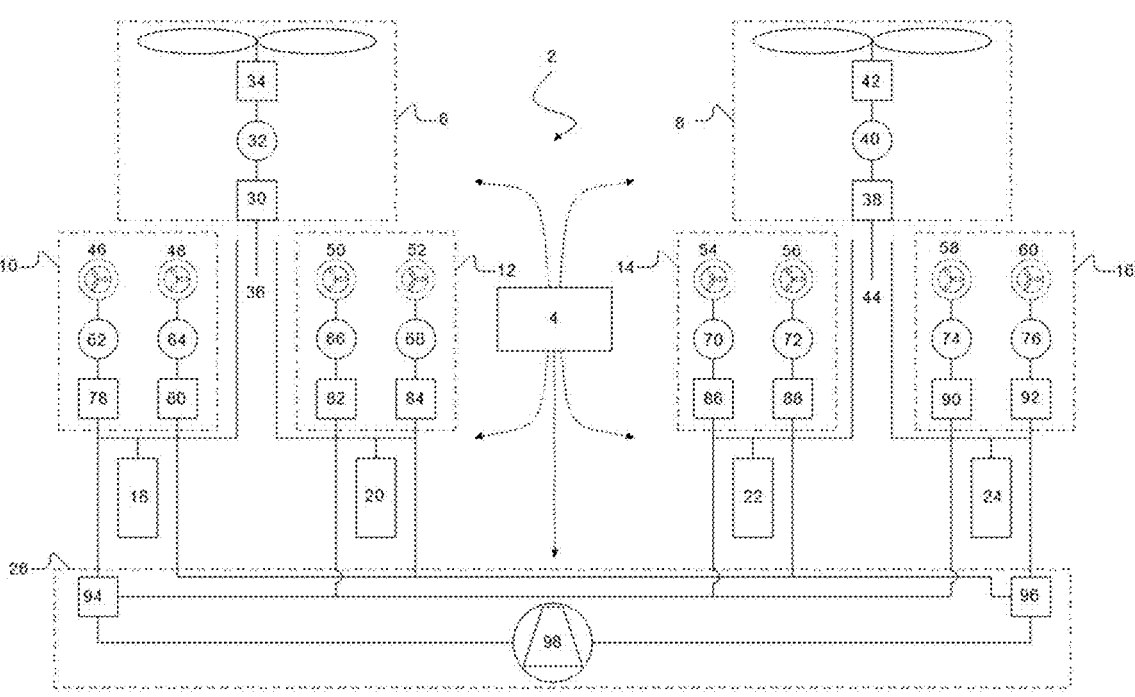
[Fig. 2]
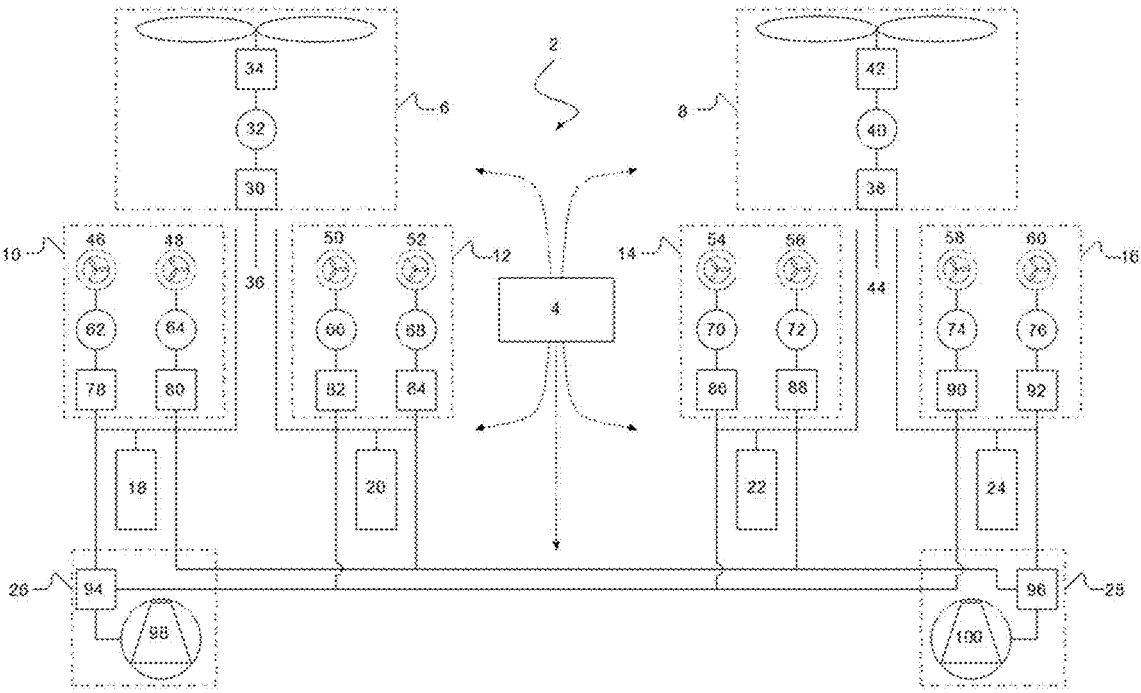

[Fig. 3]
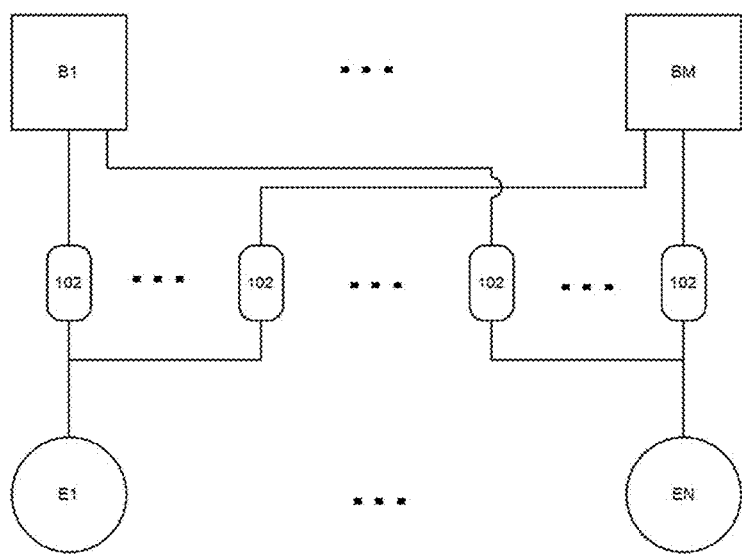
[Fig. 4]
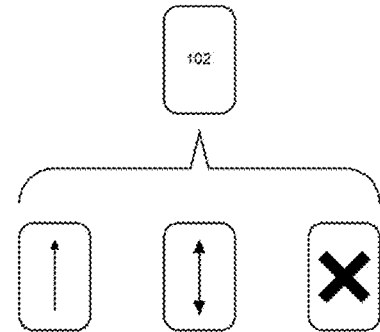
[Fig. 5]
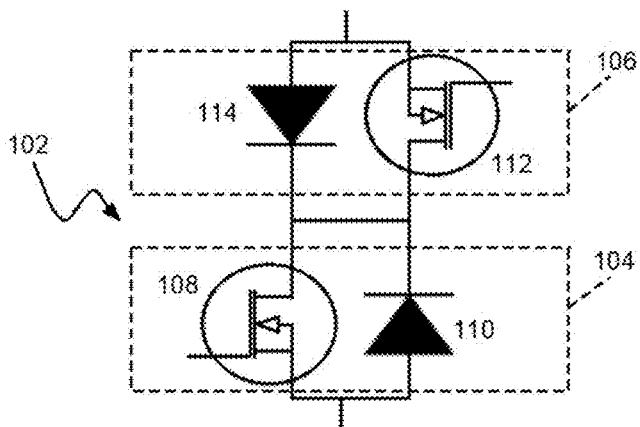

[Fig. 6]
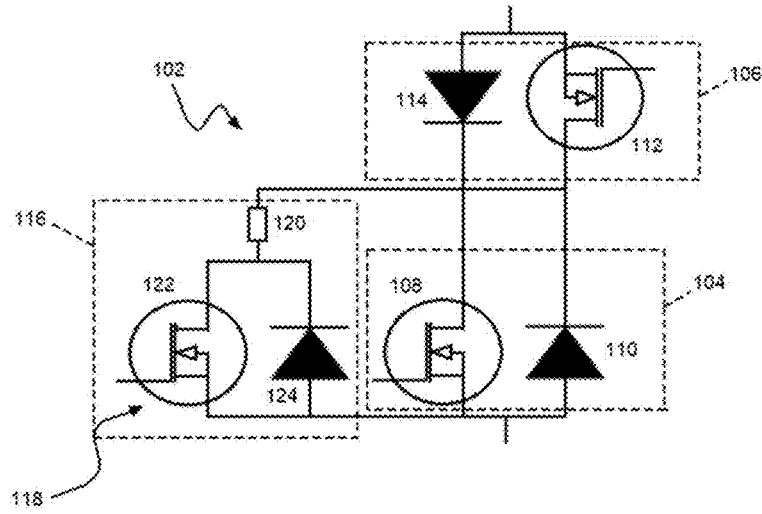
[Fig. 7]
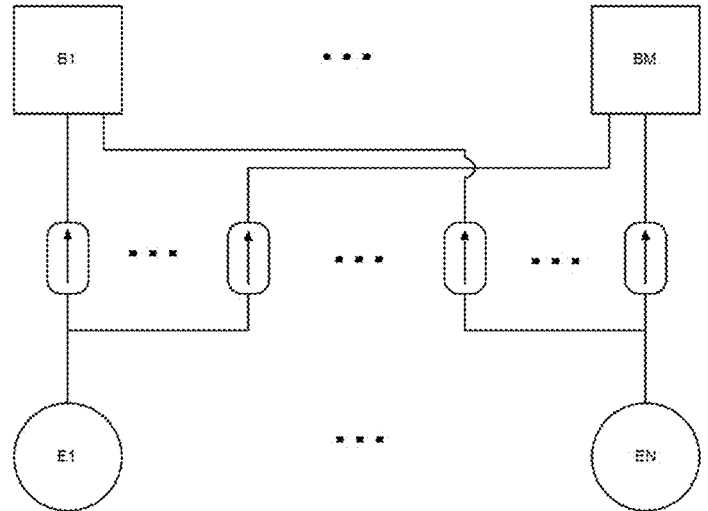

[Fig. 8]
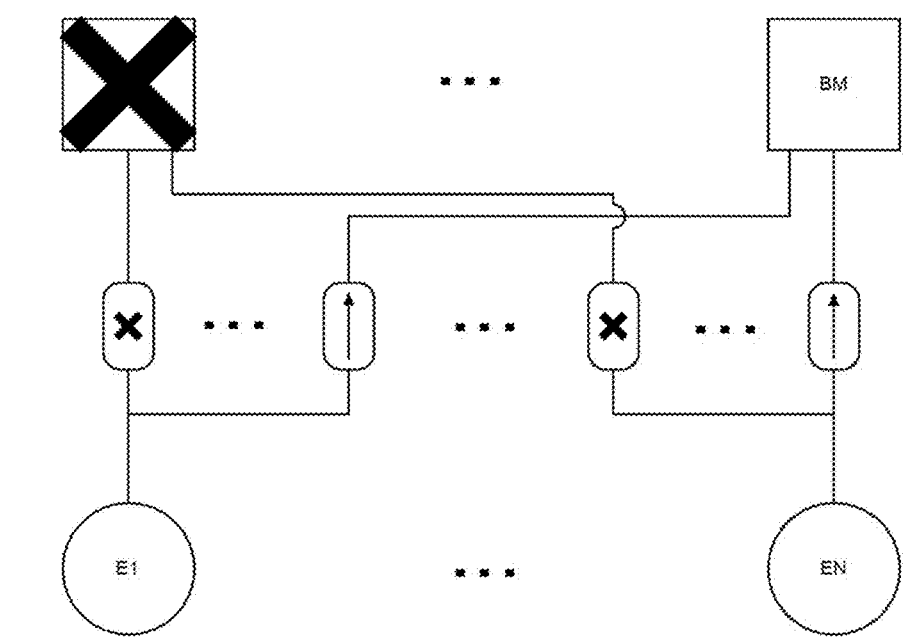
[Fig. 9]
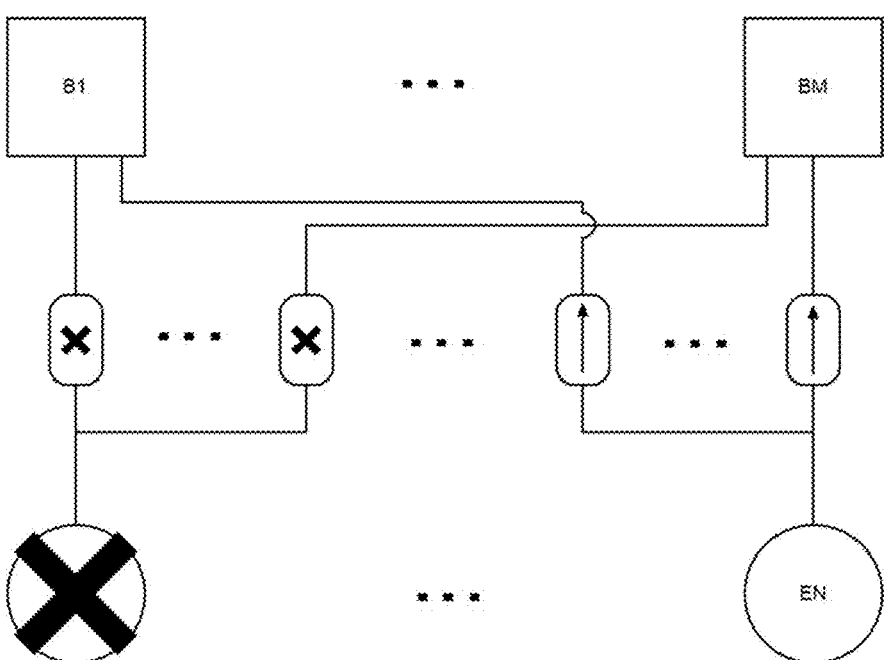

[Fig. 10]
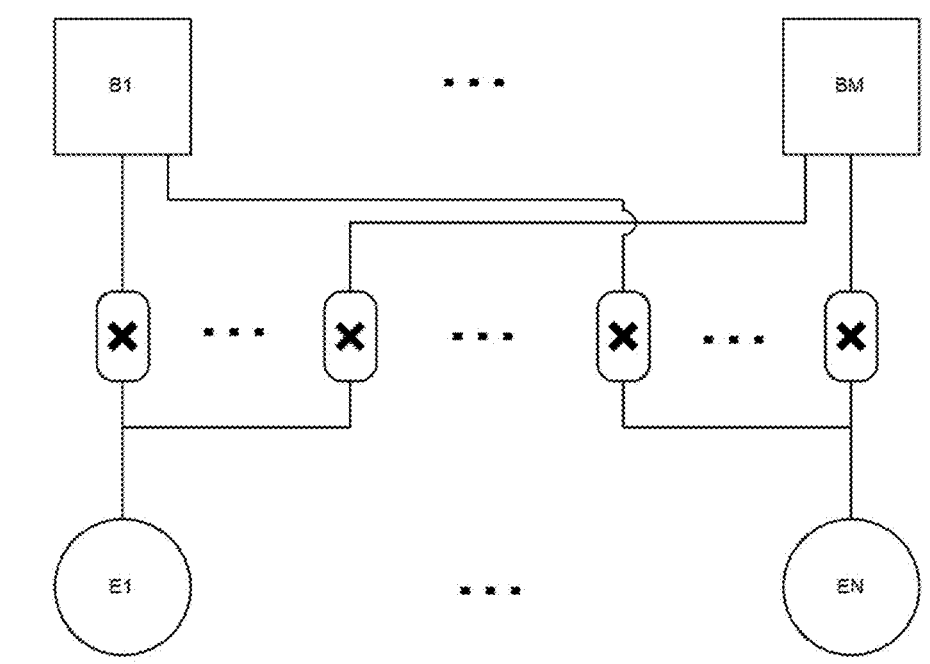
[Fig. 11]
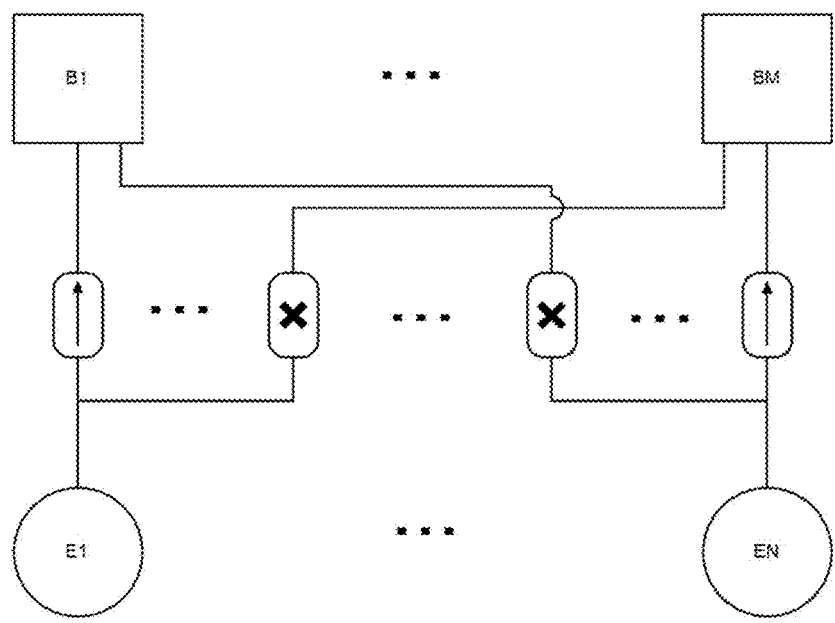

[Fig. 12]
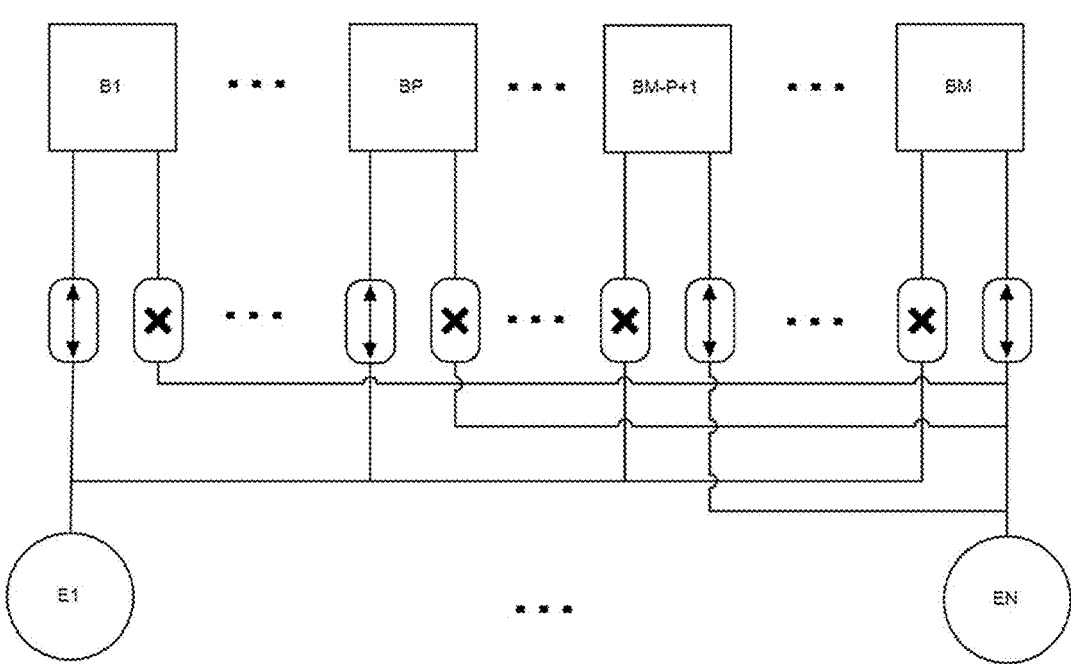

AIRCRAFT WITH HYBRID POWER SOURCE AND WITH JUNCTION HAVING A TRANSISTOR FOR DISTRIBUTION AND PROTECTION

The field of the invention relates to aircraft, and more particularly to electrically powered aircraft.

Aviation is currently undergoing many changes linked to environmental constraints, and in particular the requirement to gradually reduce greenhouse gas emissions such as carbon dioxide ($CO_2$). As such, the development of electrically powered aircraft appears to be real progress.

The classic architecture of an electrically powered aircraft integrates at least one electrical generation source arranged to supply battery packs, which provide power to drive units according to their needs. For example, in the case of an electric Vertical Take-Off and Landing (eVTOL) aircraft, the batteries are combined with vertical drive units and horizontal drive units. The multiplication of batteries in particular enables compliance with safety standards that impose redundancy of components to ensure continued safe flight and landing.

In particular, in the case of a hybrid powered aircraft, the electrical generation source comprises a fuel-based electrical energy generator, for example a turbo engine or a fuel cell.

The battery supply circuit can be configured so that the batteries are connected to each other in parallel. Such a circuit is then provided with a separation protection system to isolate the batteries from each other in the event of failure, and notably short circuit. Activation of such a protection system however results in a significant loss of power due to the isolation of one of the batteries.

One possible solution to prevent a failure from spreading to all batteries while limiting potential power loss is to separate the batteries directly and to arrange the power circuit accordingly. However, such a separation principle is impeded in the case of a hybrid powered aircraft. Indeed, a hybrid powered aircraft has this particularity that the batteries are generally more numerous than the electrical generation sources for redundancy reasons, which involves connecting the batteries to each other via shared electrical generation sources. Such interconnection constitutes a common point of failure between batteries powered by the same electrical generation source.

In addition, each battery is usually coupled to an electrical converter, for example an inverter or a rectifier. As a result, the multiplication of the batteries, and therefore the electrical converters, has a significant impact on the weight of the aircraft and therefore on its electrical energy consumption during a flight.

The present invention improves the situation.

As such, the invention relates to a hybrid powered aircraft comprising:

at least two drive units each comprising a propulsion unit and an electric motor, at least one stored electrical energy source arranged to provide the electrical energy to one or more of the electric motors, at least one electrical generation source comprising a fuel-based electrical energy generator and connected to each stored electrical energy source, and a power supply control device arranged to transmit a power command 30 to the at least one electrical generation source according to the power requirements of the drive units, the at least one stored electrical energy source being arranged to provide electrical energy according to the difference between the power requirements of the drive units and the power provided by the at least one electrical generation source based on the power command, the at least one source of electrical generation being further capable of recharging the at least one stored electrical energy source such that each stored electrical energy source is treated passively.

Each electrical generation source includes at least one electrical converter, which is connected to each stored electrical energy source via a respective junction including:

a first metal-oxide-semiconductor field-effect transistor and a second metal-oxide semiconductor field-effect transistor connected in series and in opposite forward directions, or two electrical circuits each comprising a insulated-gate bipolar transistor and a reverse diode connected in parallel, the two electrical circuits being connected in series and in opposite forward directions.

The power supply control device is arranged to control the operation of each junction according to a set of states consisting of: a unidirectional state in which the current flows from the electrical converter to the stored electrical energy source, a bidirectional state in which the current flows in both directions, and a blocking state in which the flow of the current is blocked.

In one or more embodiments, the first metal-oxide-semiconductor field-effect transistor and the second metal-oxide-semiconductor field-effect transistor of at least one junction are made of silicon carbide.

In one or more embodiments, at least one junction further includes an electronic component comprising a resistor connected in series with:

a metal-oxide-semiconductor field-effect transistor, or an electrical circuit comprising a insulated-gate bipolar transistor and a reverse diode connected in parallel, the electronic component being arranged to enable precharging of the corresponding stored electrical energy source.

In one or more embodiments, at least one stored electrical energy source is a battery.

In one or more embodiments, the drive units comprise at least one take-off drive unit and at least one cruise drive unit.

For example, at least one take-off drive unit is a vertical take-off and landing drive unit, and at least one cruise drive unit is a horizontal drive unit.

In one or more embodiments, the fuel-based electrical energy generator of at least one electrical generation source is a turbo engine, and each electrical converter of the electrical generation source is an AC-DC converter.

The turbo engine can be powered by fuel, biofuel or synthetic fuel.

In one or more embodiments, the fuel-based electrical energy generator of at least one electrical generation source is a fuel cell, and each electrical converter of the electrical generation source is a DC-DC converter.

In one or more embodiments, the aircraft is arranged to operate at least according to a turbo mode in which the power requirements of the drive units require a supply of power from the at least one electrical generation source and the at least one stored electrical energy source, and in which the power supply control device controls each junction according to the unidirectional state.

In one or more embodiments, the aircraft is arranged to operate at least according to an energy saving mode in which the power supply control device controls each junction according to the blocking state.

In one or more embodiments, the aircraft is arranged to operate at least according to a charging mode in which the power supply control device transmits a power command to the at least one electrical generation source in order to satisfy the power requirements of the drive units while charging the at least one stored electrical energy source.

Typically, in the charging mode, the power supply control device sequentially controls each junction in one or more charging phases, with the power supply control device being arranged to implement each charging phase by associating each electrical converter with a respective stored electrical energy source, controlling each junction between an electrical converter and an associated stored electrical energy source according to the unidirectional state and by controlling any other junction according to the blocking state, until each stored electrical energy source is charged.

Advantageously, the aircraft comprises a plurality of stored electrical energy sources and, in the charging mode, the power supply control device sequentially controls each junction in one or more charging phases, the power supply control device being arranged to implement each charging phase by associating each electrical converter with several respective stored electrical energy sources, controlling each junction between an electrical converter and an associated stored electrical energy source according to the bidirectional state and controlling any other junction according to the blocking state, until each stored electrical energy source is charged.

In one or more embodiments, the aircraft is arranged to operate at least according to a buffer mode in which the power supply control device transmits a power command to the at least one electrical generation source in order to satisfy the power requirements of the drive units via the at least one stored electrical energy source, and in which the power supply control device sequentially controls each junction in one or more power phases, the power supply control device being arranged to implement each power supply phase by associating each electrical converter with a respective stored electrical energy source, by controlling each junction between an electrical converter and an associated stored electrical energy source according to the unidirectional state, and by controlling any other junction according to the blocking state, until the power requirements of the drive units are satisfied.

Other features, details and benefits will appear upon reading the detailed description below, and upon analysing the attached drawings on which:

FIG. 1 represents a schematic view of the electrical architecture of an aircraft according to the invention comprising a single electrical generation source, FIG. 2 represents a schematic view of the electrical architecture of an aircraft according to the invention comprising two electrical generation sources, FIG. 3 illustrates a circuit supplying batteries by electrical converters via junctions within the electrical architecture of an aircraft according to the invention, FIG. 4 illustrates the possible states of a junction, FIG. 5 schematically illustrates the structure of a junction, FIG. 6 schematically illustrates an embodiment of the structure of FIG. 5

FIG. 7 illustrates the supply circuit of FIG. 3 in a so-called "turbo mode" of operation of the aircraft, FIG. 8 illustrates the turbo mode of FIG. 7 in the event of a battery failure, FIG. 9 illustrates the turbo mode of FIG. 7 in case of failure of an electrical converter, FIG. 10 illustrates the supply circuit of FIG. 3 in a so-called "energy saving mode" of operation of the aircraft, FIG. 11 illustrates the supply circuit of FIG. 3 in a so-called "charging mode" of operation or in a so-called "buffer mode" of operation of the aircraft, and FIG. 12 illustrates the charging mode or buffer mode of FIG. 11 in a particular case.

FIG. 1 illustrates an aircraft 2 comprising a power supply control device 4, a plurality of drive units 6, 8, 10, 12, 14 and 16, a plurality of stored electrical energy sources 18, 20, 22 and 24, and an electrical generation source 26.

Typically, the two drive units 6 and 8 are cruise drive units that are exploited during the flight phase between take-off and landing, while the four drive units 10, 12, 14 and 16 are take-off drive units exploited during the take-off phase.

By way of example, the aircraft 2 may be an electric vertical take-off and landing (eVTOL) aircraft, in which case the four take-off drive units 10, 12, 14 and 16 are vertical drive units, and the two cruise drive units 6 and 8 are horizontal drive units.

In the example shown in FIG. 1, the cruise drive unit 6 comprises a DC-AC converter 30, an electric motor 32 and a propulsion unit 34. Similarly, the cruise drive unit 8 comprises a DC-AC converter 38, an electric motor 40 and a propulsion unit 42.

The DC-AC converter 30 (38 respectively) can also be called "inverter" and is arranged to generate alternating current from a direct current.

The propulsion unit 34 (respectively 42), which corresponds for example to a propeller, is arranged to allow the aircraft 2 to move in a substantially horizontal direction. In flight regime, the propulsion unit 34 (respectively 42) consumes around 150 kilowatts (kW) of power.

The cruise drive unit 6 (respectively 8) is connected as an input to a switch 36 (respectively 44) which makes it possible to connect this input to the output of the take-off drive unit 10 (respectively 14) that of the take-off drive unit 12 (respectively 16).

The take-off drive unit 10 (respectively 12, 14 and 16) comprises a propeller 46 (respectively 50, 54 and 58) driven by an electric motor 62 (respectively 66, 70 and 74), and a propeller 48 (respectively 52, 56 and 60) driven by an electric motor 64 (respectively 68, 72 and 76).

In the context of the invention, the propellers 46, 48, 50, 52, 54, 56, 58 and 60 are considered as propulsion units, in the same way as propulsion units 34 and 42.

The electric motors 62 and 64 (respectively 66 and 68, 70 and 72, 74 and 76) are respectively powered by DC-AC converters 78 and 80 (respectively 82 and 84, 86 and 88, 90 and 92). The DC-AC converters 78 and 80 (respectively 82 and 84, 86 and 88, 90 and 92) are connected to an electrical bus of the take-off drive unit 10 (respectively 12, 14 and 16).

The stored electrical energy source 18 (respectively 20, 22 and 24) is arranged to store electrical energy in order to provide it to the take-off drive unit 10 (respectively 12, 14 and 16) according to the power requirements thereof. Furthermore, the stored electrical energy sources 18 and 20 (respectively 22 and 24) are also arranged to provide electrical energy to the cruise drive unit 6 (respectively 8) via switch 36 (respectively 44).

For this purpose, the stored electrical energy source 18 (respectively 20, 22 and 24) is connected, via the electrical bus of the take-off drive unit 10 (respectively 12, 14 and 16), to the DC-AC converters 78 and 80 (respectively 82 and 84, 86 and 88, 90 and 92). In addition, the electrical bus of each of the take-off drive units 10 and 12 (respectively 14 and 16)

is connected to a respective output thereof to which the switch 36 (respectively 44) can be selectively connected.

The stored electrical energy source 18 (respectively 20, 22 and 24) is typically a battery pack, i.e. batteries of electrical accumulators each intended for storing electrical energy. Alternatively, the stored electrical energy sources 18, 20, 22 and 24 may be supercapacitors or a combination of batteries and supercapacitors.

In the remainder of the description, for the sake of conciseness, the stored electrical energy source 10 18 (respectively 20, 22 and 24) is called battery 18 (respectively 20, 22 and 24).

Typically, the batteries 18, 20, 22 and 24 together deliver a power of the order of 800 kilowatts (kw) at 100% of their respective capacities.

The electrical generation source 26 is arranged to generate electrical energy and supply each of the batteries 18, 20, 22 and 24. For this purpose, the electrical generation source 26 has several electrical distribution buses.

In the example of FIG. 1, the electrical generation source 26 is connected to a first input and a second input of each of the take-off drive units 10, 12, 14 and 16 respectively via a first electrical distribution bus and a second electrical distribution bus. The electrical distribution buses connect each take-off drive unit 10, 12, 14 and 16 to the associated battery 18, 20, 22 and 24 respectively.

In the example of FIG. 1, the electrical generation source 26 comprises 25 two electrical converters 94 and 96 as well as a fuel-based electrical energy generator 98.

More particularly here, the electrical converters 94 and 96 are AC-DC converters, while the fuel-electric energy generator 98 is a turbo engine, for example a turbine generator—or turbogenerator.

The AC-DC converter 94 is connected to the respective first inputs of the take-off drive units 10, 12, 14 and 16. Thus, the AC-DC converter 94 defines the starting point of each first electrical distribution bus connecting the electrical generation source 26 respectively to the first inputs of the take-off drive units 10, 12, 14 and 16. Likewise, the AC-DC converter 96 is connected to the second respective inputs of the take-off drive units 10, 12, 14 and 16. Thus, the AC-DC converter 96 defines the starting point of each second electrical distribution bus connecting the electrical generation source 26 respectively to the second inputs of the take-off drive units 10, 12, 14 and 16.

The AC-DC converter 94 (respectively 96) can also be called "rectifier" and is arranged to generate a direct current from an alternating current.

Typically, the turbo engine 98 can deliver a power of the order of 300 kilowatts (kW) at 100% of its capacity.

It should be noted that the electrical generation source 26 can operate both at direct current and at alternating current, in which case the converters 94 and 96 are, depending on the case, AC-DC converters or DC-to-DC converters.

The electrical generation source 26 may thus be based on a turbo engine powered by a tank of conventional fuel, biofuel or synthetic fuel (also known as synfuel). In such a case, the electrical converters 94 and 96 are AC-DC converters. Alternatively, the electrical generation source 26 may be based on a hydrogen-based energy source, such as a fuel cell. In such a case, the electrical converters 94 and 96 are DC-DC converters. Within the scope of the invention, such energy sources are considered as fuel-based electrical energy generators.

The power supply control device 4 is a low-voltage apparatus arranged to control, on the one hand, the electrical generation source 26 and, on the other hand, the switches 36 and 44, as well as various protective elements not shown in FIG. 1.

The electrical architecture of the aircraft 2 makes it possible to have a real hybridisation of the batteries 18, 20, 22 and 24, and not a simple juxtaposition. So, depending on the power requirements, the batteries 18, 20, 22 and 24 and the electrical generation source 26 can operate together.

The batteries 18, 20, 22 and 24 are conventional batteries whose operation is governed by a conventional control system (better known as BMS for "Battery Management System"). Such a system enables functions such as monitoring of parameters—voltage, temperature, state of charge, health status, etc.—, the prevention of any risk of departing from the intended operating range—overvoltage, overcurrent, overheating, etc.—, or optimisation of battery capacities. In the context of the invention, no other intelligence, in particular software or hardware, is required. Therefore, the batteries 18, 20, 22 and 24 are treated passively in the sense that their integration does not require any particular adaptation outside of the way, detailed below, in which the batteries 18, 20, 22 and 24 are connected to the electrical converters 94 and 96. From the point of view of the rest of the electrical architecture of the aircraft 2, the batteries 18, 20, 22 and 24 are seen as mere energy buffers. This goes against existing solutions in which: either an element is specifically designed to optimise the operation of the batteries and plays a control role, or an element is designed to compensate for a possible failure of the batteries, but exclusively alternately i.e. without the batteries and this element being capable of operating simultaneously.

In the embodiment illustrated in FIG. 1, the aircraft 2 comprises a single 30 electrical generation source, namely the electrical generation source 26. However, it should be understood here that the aircraft 2 may comprise a plurality of electrical generation sources.

By way of example, FIG. 2 represents an embodiment in which the aircraft 2 comprises two electrical generation sources 26 and 28. The electrical generation source 26 (respectively 28) comprises an electrical converter 94 (respectively 96) and a fuel-based electrical generator 98 (respectively 100).

In the example of FIG. 2, the fuel-based electric generator 98 (respectively 100) is a turbo engine and the electrical converter 94 (respectively 96) is an AC-DC converter.

Typically, the fuel-based electrical energy generators 98 and 100 can each deliver a power of the order of 150 kilowatts (kW) at 100% of their respective capacities. Again, each of the electrical generation sources 26 and 28 may be based on a turbo engine powered by a tank of conventional fuel, biofuel or synthetic fuel. Alternatively, an energy source powered by a hydrogen tank, such as a fuel cell, can be used.

The overall electrical architecture of the aircraft 2 was described with reference to FIG. 1 and FIG. 2.

As detailed previously, the aircraft 2 comprises at least one electrical generation source—a single electrical generation source 26 in FIG. 1, two electrical generation sources 26 and 28 in FIG. 2—arranged to supply one or more stored electrical energy sources—four batteries 18, 20, 22 and 24 in FIG. 1 and FIG. 2.

The aircraft 2 is an hybrid powered aircraft and therefore generally comprises more batteries than electrical generation sources. Furthermore, the starting point of each electrical distribution bus of each electrical generation source is defined by an electrical converter—here the AC-DC converters 94 and 96—such that the number of electrical converters is reduced and the weight of aircraft 2 is lessened. In other words, the electrical converters are at the electrical generation sources and not at the batteries.

For illustration purposes, the electrical architectures respectively shown in FIG. 1 and FIG. 2 include only two electrical converters 94 and 96 for four batteries 18, 20, 22 and 24.

However, this advantage relative to the weight of the aircraft 2 has a counterpart: the batteries 18, 20, 22 and 24 are connected to each other via the electrical generation source(s) 26 and 28. Consequently, any short circuit occurring at an electrical generation source or a battery is likely to spread.

To solve this problem, the Applicant proposes the power circuit shown in FIG. 3. In the following description, we will now look at how the electrical converters are connected to the batteries.

FIG. 3 illustrates a circuit for supplying one or more stored electrical energy sources B1, . . . , BM by one or more electrical converters E1, . . . , EN. Here, M is a non-zero natural integer corresponding to the number of stored electrical energy sources while N is a non-zero natural integer corresponding to the number of electrical converters.

It is understood that the supply circuit described herein is a generalisation of the part of the electrical architecture of FIG. 1 or FIG. 2 relating to the electrical converters 94 and 96 and batteries 18, 20, 22 and 24. Thus, taking M=4 and N=2, we find the same configuration as that of FIG. 1 or FIG. 2, with the stored electrical energy sources B1, B2, B3 and B4 corresponding to batteries 18, 20, 22 and 24 respectively; the electrical converters E1 and E2 corresponding to the electrical converters 94 and 96 respectively.

For the sake of conciseness, the stored electrical energy sources B1, . . . , BM are hereunder respectively called batteries B1, . . . , BM. It should be noted that it is possible that only one electrical converter is present in the electrical architecture of the aircraft 2, in which case N=1. Still remaining general, it is considered in the remainder of the description that there is a plurality of electrical converters E1, EN and a plurality of batteries B1, . . . , BM.

As shown in FIG. 3, each electrical converter E1, . . . , EN is connected to each battery B1, . . . , BM by a respective junction 102. Consequently, the supply circuit comprises as many junctions as there are possible pairs formed of an electrical converter E1, . . . , EN and a battery B1, . . . , BM, i.e. N×M junctions 102.

As shown in FIG. 4, the junction 102 is arranged to operate exclusively according to three possible states: a unidirectional state, a bidirectional and a blocking state. More specifically, the operation of each junction 102 is controlled by the power supply control device 4.

In the unidirectional state, the junction 102 allows the current to flow from the electrical converter to the battery. Of course, the current cannot then flow in the opposite direction, i.e. from the battery to the electrical converter.

In the bidirectional state, the junction 102 allows the current to flow in both directions, namely from the electrical converter to the battery but also from the battery to the electrical converter.

Finally, in the blocking state, the junction 102 blocks the flow of current, in both directions.

It should be understood here that the junction 102 can only operate according to these three states. In particular, the power supply control device 4 cannot control the junction 102 to operate in a state in which the current could only flow from the battery to the electrical converter.

The structure of the junction 102 is discussed hereunder with reference to FIG. 5 and FIG. 6.

In an embodiment illustrated in FIG. 5, the junction 102 is made using the technology of the metal-oxide-semiconductor field-effect transistor (better known under the acronym MOSFET) or insulated-gate field-effect transistor.

More particularly, the junction 102 comprises a first MOSFET 104 and a second MOSFET 106 connected in series. Each MOSFET 104, 106 comprises three electrodes—the gate, the drain, and the source—which together form a semiconductor 108, 112. Furthermore, each MOSFET 104, 106 also comprises a parasitic element formed by the p-n junction between the drain and the source: a diode 110, 114. The diode 110, 114—often referred to as "body diode"—is inherent in the MOSFET 104, 106.

The forward direction of each diode 110, 114 is opposite to that of the corresponding semiconductor 108, 112. The term "forward direction" here means the direction of flow of the current. Thus, for the semiconductor 108, 112, the current flows from the drain to the source for an N-type channel—as in FIG. 5—, and from the source to the drain for a P-type channel.

To give the junction 102 the properties illustrated in FIG. 4, i.e. operation possible according to a unidirectional state, a bidirectional state and a blocking state, the first MOSFET 104 and the second MOSFET 106 are connected such that their respective semiconductors 108, 112 are of 44 opposite forward directions. In an equivalent manner, the respective diodes 110, 114 of the first MOSFET 104 and of the second MOSFET 106 are then also of opposite forward directions. The first MOSFET 104 and the second MOSFET 106 are therefore connected in series and in opposite forward directions.

Each MOSFET 104, 106 is for example a silicon carbide MOSFET—or SiC MOSFET.

The junction 102 is in the unidirectional state when the first MOSFET 104 is in the blocking state and the second MOSFET 106 is in the on-state. In other words, the junction 102 is in the unidirectional state when only the MOSFET whose semiconductor has a forward direction from the electrical converter to the battery is in the on-state. The junction 102 is in the bidirectional state when the first MOSFET 104 and the second MOSFET 106 are in the on-state. The junction 102 is in the blocking state when the first MOSFET 104 and the second MOSFET 106 are in the blocking state.

The status—blocking or on—of each MOSFET 104 and 106 is controlled by the power supply control device 4. To do this, the power supply control device 4 applies to the gate of each MOSFET 104, 106 the voltage necessary to make it switch from the blocking state to the on-state.

Alternatively, each MOSFET 104, 106 may be replaced by an insulated-gate bipolar transistor (better known by the acronym IGBT) connected in parallel with a reverse diode, i.e. a diode whose forward direction is opposite to that of the IGBT. In such an embodiment, each IGBT therefore replaces the semiconductor 108, 112 of a MOSFET 104, 106m while each reverse diode replaces the diode 110, 114.

The junction 102 then comprises two electrical circuits connected in series, each electrical circuit comprising an IGBT and a reverse diode connected in parallel. These two electrical circuits are also of opposite forward directions, whether their respective IGBTs or their respective reverse diodes are compared.

FIG. 6 represents an embodiment in which, within the junction 102, the first MOSFET 104 and the second MOSFET 106 are associated with an electronic component 116.

Specifically, the first MOSFET 104 and the second MOS-FET 106 are connected in series to the positive wire, while the electronic component 116 is arranged on the negative wire.

The electronic component 116 comprises a MOSFET 118 and a resistor 120 connected in series. Like the first MOS-FET 104 and the second MOSFET 106, the third MOSFET 118 comprises a semiconductor 122 and a parasitic diode 124.

The electronic component 116 is arranged on the negative wire so that the forward direction of the third MOSFET 118 goes from the battery to the electrical converter. In an equivalent manner, the forward direction of the diode 124 goes from the electrical converter to the battery. As shown in FIG. 6, the third MOSFET 118 is in fact oriented in the same manner as the first MOSFET 104.

The third MOSFET 118 is for example a SiC MOSFET. Furthermore, again, the third MOSFET 118 can be replaced by an IGBT connected in parallel with a reverse diode.

The electronic component 116 makes it possible to pre-charge, via the negative wire, the corresponding battery.

The use of a transistor—whether a MOSFET or an IGBT—makes it possible to reduce the mass of the junction 102 compared to a solution in which the junction 102 would be made with electromechanical contactors or relays. By way of illustration, the mass of a SiC MOSFET is in the order of 6 grams (g) compared to approximately 750 grams (g) for an electromechanical relay. In addition to being heavier and more bulky, electromechanical contactors and relays also have the disadvantage that they include moving parts—the contacts—which increase the risk of failure (friction, sparks) when the power is restored or disconnected.

As detailed below, the proposed supply circuit, and in particular the use of the junctions 102, adapts both to the nominal operation of the aircraft 2 and in the event of failure, i.e. when at least one battery is unavailable or when at least one electrical converter is unavailable.

FIG. 7 illustrates an operating mode of the aircraft 2—or turbo mode—in which the power requirements of the drive units, and more precisely of their respective electric motors, are very high to the point that the batteries B1, . . . , BM and the electrical generation source(s), i.e. the electrical converters E1, . . . , EN, are exploited to their maximum capacity.

The power supply control device 4 then commands each junction 102 to operate according to the unidirectional state. Thus, each electricalconverter E1, . . . , EN powers each battery B1, . . . , BM. In the event of a fault, for example a short circuit, with one of the batteries B1, . . . , BM, that battery cannot propagate to the other batteries B1, . . . , BM since the current generated by a short circuit is blocked by each junction 102 to which the faulty battery is connected. The same applies in the event that fault appears with an electrical converter: the current generated by a short circuit cannot circulate from a battery to the faulty electrical converter.

In either case, the power supply control device 4 can then isolate the faulty element. To do this, the power supply control device 4 commands the junctions 102 connected to the faulty element to switch them from the unidirectional state to the blocking state.

In the case, shown in FIG. 8, where a failure occurs with the battery B1, the power supply control device 4 isolates the battery B1 by switching all the junctions 102 through which the electrical converters E1, . . . , EN are connected to the battery B1 from the unidirectional state to the blocking state. In addition, given that a battery, here the battery B1, is no longer powered, the electrical energy that was originally intended for it can be distributed to the other batteries, here the batteries B2, . . . , BM. It is understood that the power supply circuit is flexible enough to implement dynamic power allocation and thus provide electrical energy to a battery whose requirements are higher than those of the others.

In this case, shown in FIG. 9, where a failure occurs with the electrical converter E1, the power supply control device 4 isolates the electrical converter E1 by switching all junctions 102 through which the electrical converter E1 is connected to the batteries B1, . . . , BM from the unidirectional state to the blocking state.

FIG. 10 illustrates an operating mode of the aircraft 2—or energy-saving mode—in which no power is required from the electrical generation source(s), or therefore the electrical converters E1, . . . , EN.

The power supply control device 4 then commands each junction 102 to operate according to the blocking state. In case of failure, for example a short circuit, with one of the batteries B1, . . . , BM, or one of the electrical converters E1, . . . , EN, that batter cannot propagate since the current generated by a short circuit is blocked by each junction 102.

FIG. 11 illustrates a mode of operation of the aircraft 2—or charging mode—in which the power requirements of the drive units, and more precisely of their respective electric motors, are so low that the electrical converters E1, . . . , EN power the drive units with electrical energy via the batteries B1, . . . , BM while charging them.

For this purpose, each electrical converter E1, . . . , EN is respectively associated with one battery from among the batteries B1, . . . , BM.

The power supply control device 4 then commands each junction 102 such that the junction 102 between an electrical converter and the battery associated with it is in the unidirectional state, and the other junctions 102—i.e. each junction 102 between an electrical converter and a battery that are not associated—are in the blocking state.

When the N batteries each associated with an electrical converter are charged, the electrical converters E1, . . . , EN are all assigned a new battery to charge, and so on. The batteries B1, . . . , BM are thus sequentially charged a maximum of N times per charging phase—or iteration. Of course, an electrical converter E1, . . . , EN may not be associated with a new battery if the number of batteries remaining to be charged is strictly less than the number of electrical converters.

FIG. 11 thus illustrates an iteration in which the electrical converter E1 is associated with the battery B1 and in which the electrical converter EN is associated with the battery BM.

If M is divisible by N, then the number of iterations necessary to charge all of the batteries B1, . . . , BM is M/N. On the other hand, if M is not divisible by N, the number of iterations necessary to charge all of the batteries B1, . . . , BM is [M/N]+1, where [•] is the floor function. For the last iteration, so to charge a number of batteries equal to the rest of the Euclidean division of M by N, it is possible to use all electrical converters to charge the remaining batteries faster.

The selection, at each iteration, of the N batteries to be charged may depend on the respective charge levels of the batteries B1, . . . , BM, for example to give priority to the batteries with the lowest charge level or, conversely, to the batteries with the highest charge level.

Furthermore, FIG. 11 also illustrates another operating mode of the aircraft 2—or buffer mode—in which the power requirements of the drive units, and more precisely of their respective electric motors, are low, but in which the batteries B1, . . . , BM do not need to be charged.

The batteries B1, . . . , BM are treated passively, like energy buffers. In other words, the power provided by the electrical converters E1, . . . , EN simply passes through the batteries B1, . . . , BM in order to supply power to the drive units.

Similarly to the charging mode, the power supply control device 4 implements one or more supply phases—or iterations. At each iteration, each electrical converter E1, . . . , EN is respectively associated with one battery from among the batteries B1, . . . , BM. The power supply control device 4 then controls each junction 102 such that the junction 102 between an electrical converter and the battery to which it is associated is in the unidirectional state, and the other junctions 102—i.e. the respective junctions 102 between an electrical converter and the batteries to which it is not associated—are in the blocking state. The buffer mode ends when the power requirements of the drive units are met.

In the example of FIG. 11, each electrical converter is successively associated with a battery. However, it is also possible to associate, for each iteration, several batteries to each electrical converter.

Thus, in the case illustrated in FIG. 12, each of the electrical converters E1, . . . , EN is respectively associated with a number P of batteries, where P is a natural integer equal to or greater than 2. In this case, the electrical converter E1 is associated with the first P batteries, i.e. the batteries B1, . . . , BP, while the electrical converter EN is associated with the last P batteries, i.e. the batteries BM-P+1, . . . , BM.

The power supply control device 4 then controls each junction 102 such that the junction 102 between an electrical converter and a battery that is associated with it is in the bidirectional state, and the other junctions 102—i.e. each junction 102 between an electrical converter and a battery that are not associated—are in a blocking state.

Thus, in the example of FIG. 12, the junction 102 between each of the batteries B1, . . . , BP and the electrical converter E1 is in the bidirectional state. Similarly, the junction 102 between each of the batteries BM-P+1, . . . , BM and the electrical converter EN is in the bidirectional state. On the other hand, the junction 102 between each of the batteries B1, . . . , BP and the electrical converters other than E1 is in the blocking state. Similarly, the junction 102 between each of the batteries BM-P+1, . . . , BM and the electrical converters other than EN is in blocking state.

In other words, if a given battery is considered, it is connected to the N electrical converters E1, . . . , EN via the respective N junctions 102 and, in the case of FIG. 12, these N junctions 102 are commanded by the power supply control device 4 as follows: the junction 102 between the given battery and the associated electrical converter is in the bidirectional state, while the N−1 other junctions 102 are in the blocking state.

In the charging mode of the aircraft 2, the embodiment of FIG. 12 has the advantage of reducing the charging time.

The bidirectional state of the junctions 102 between an electrical converter and the P batteries to which it is associated makes it possible to obtain a cross-flow between these P batteries, such that they are seen by the associated electrical converter as a single battery.

The consequence of the bidirectionality is that any failure, for example a short circuit, which occurs with one battery propagates to the P−1 other 30 batteries associated with the same electrical converter. However, this effect is confined to the P batteries and does not propagate to the other batteries due to the blocking state of the junctions 102 by which these other batteries are connected to the electrical converter to which the faulty battery is associated.

The configuration of the junctions 102 illustrated in FIG. 12 may also apply to buffer mode, and not only to charging mode.

The invention claimed is:

1. A hybrid powered aircraft comprising:
at least two drive units each comprising a propulsion unit and an electric motor,
at least one stored electrical energy source arranged to provide electrical energy to one or more of the electric motors,
at least one electrical generation source comprising a fuel-based electrical energy generator and connected to each stored electrical energy source, and
a power supply control device arranged to output a power command to the at least one electrical generation source according to the power requirements of the drive units, the at least one stored electrical energy source being arranged to provide electrical energy according to a difference between the power requirements of the drive units and power provided by the at least one electrical generation source on the basis of the power command, the at least one electrical generation source being further configured to recharge the at least one stored electrical energy source such that each stored electrical energy source is treated passively,
wherein each electrical generation source comprises at least one electrical converter, which is connected to each stored electrical energy source via a respective junction including:
a first metal-oxide-semiconductor field-effect transistor and a second metal-oxide-semiconductor field-effect transistor connected in series and of opposite forward directions, or
two electrical circuits each comprising an insulated-gate bipolar transistor and a reverse diode connected in parallel, the two electrical circuits being connected in series and of opposite forward directions,
and wherein the power supply control device is arranged to control the operation of each junction according to a set of states consisting of: a unidirectional state in which a current flows from the electrical converter to the stored electrical energy source, a bidirectional state in which the current flows in both directions, and a blocking state in which the flow of the current is blocked.

2. The aircraft according to claim 1, wherein the first metal-oxide-semiconductor field-effect transistor and the second metal-oxide-semiconductor field-effect transistor of at least one junction are made of silicon carbide.

3. The aircraft according to claim 1, wherein at least one junction further comprises an electronic component comprising a resistor connected in series with:
a metal-oxide-semiconductor field-effect transistor, or
an electrical circuit comprising an insulated-gate bipolar transistor and a reverse diode connected in parallel,
said electronic component being arranged to allow precharging of the corresponding stored electrical energy source.

4. The aircraft according to claim 1, wherein at least one stored electrical energy source is a battery.

5. The aircraft according to claim 1, wherein the drive units comprise at least one take-off drive unit and at least one cruise drive unit.

6. The aircraft according to claim 5, wherein at least one take-off drive unit is a vertical take-off and landing drive unit, and at least one cruise drive unit is a horizontal drive unit.

7. The aircraft according to claim 1, wherein the fuel-based electrical energy generator of at least one electrical generation source is a turbo engine, and wherein each electrical converter of said electrical generation source is an AC-DC converter.

8. The aircraft according to claim 7, wherein the turbo engine is powered by fuel, biofuel or synthetic fuel.

9. The aircraft according to claim 1, wherein the fuel-based electrical energy generator of at least one electrical generation source is a fuel cell, and wherein each electrical converter of said electrical generation source is a DC-DC converter.

10. The aircraft according to claim 1, configured to operate at least according to a turbo mode in which the power requirements of the drive units require a power supply from the at least one electrical generation source and the at least one stored electrical energy source, and in which the power supply control device controls each junction according to the unidirectional state.

11. The aircraft according to claim 1, configured to operate at least according to an energy-saving mode in which the power supply control device controls each junction according to the blocking state.

12. The aircraft according to claim 1, configured to operate at least according to a charging mode in which the power supply control device outputs a power command to the at least one electrical generation source to satisfy the power requirements of the drive units, while charging the at least one stored electrical energy source.

13. The aircraft according to claim 12, wherein, in the charging mode, the power supply control device sequentially controls each junction in one or more charging phases, the power supply control device being arranged to imple-ment each charging phase by associating each electrical converter with a respective stored electrical energy source controlling each junction between an electrical converter and an associated stored electrical energy source according to the unidirectional state, and controlling any other junction according to the blocking state, until each stored electrical energy source is charged.

14. The aircraft according to claim 12, comprising a plurality of stored electrical energy sources, and wherein, in the charging mode, the power supply control device sequentially controls each junction in one or more charging phases, the power supply control device being arranged to implement each charging phase by associating each electrical converter with several respective stored electrical energy sources, controlling each junction between an electrical converter and an associated stored electrical energy source according to the bidirectional state, and controlling any other junction according to the blocking state, until each stored electrical energy source is charged.

15. The aircrafts according to claim 1, configured to operate at least according to a buffer mode in which the power supply control device transmits a power command to the at least one electrical generation source in order to satisfy the power requirements of the drive units via the at least one stored electrical energy source, and in which the power supply control device sequentially controls each junction in one or more power phases, the power supply control device being arranged to implement each power phase by associating each electrical converter with a respective stored electrical energy source, controlling each junction between an electrical converter and an associated stored electrical energy source according to the unidirectional state, and controlling any other junction according to the blocking state, until the power requirements of the drive units are satisfied.

* * * * *